US006190100B1

(12) United States Patent
Mawji

(10) Patent No.: US 6,190,100 B1
(45) Date of Patent: Feb. 20, 2001

(54) TRAILER FOR CARRYING LOADS HAVING A CURVED CONFIGURATION

(76) Inventor: Saifudin N. J. Mawji, 239 Elmwood Avenue, Toronto, ON (CA), M2N 3M8

( * ) Notice: Under 35 U.S.C. 154(b), the term of this patent shall be extended for 0 days.

(21) Appl. No.: 09/357,383

(22) Filed: Jul. 20, 1999

(51) Int. Cl.⁷ ............................... B60P 7/12; B61D 3/16
(52) U.S. Cl. ................................. 410/49; 410/47
(58) Field of Search ................... 410/47, 48, 49, 410/50; 280/781, 789, 795; 296/181, 203.01, 182, 25

(56) References Cited

U.S. PATENT DOCUMENTS

| | | |
|---|---|---|
| 2,622,918 | * 12/1952 | Staffe . |
| 2,971,795 | * 2/1961 | Winski . |
| 3,307,495 | * 3/1967 | Chapman et al. . |
| 3,353,506 | * 11/1967 | Snyder et al. . |
| 3,376,062 | * 4/1968 | Chosy et al. . |
| 3,581,674 | * 6/1971 | O'Leary . |
| 4,365,820 | * 12/1982 | Rush . |
| 5,211,518 | * 5/1993 | Mimica . |
| 5,507,514 | * 4/1996 | Jacques . |
| 5,622,116 | * 4/1997 | Carlton . |

* cited by examiner

Primary Examiner—D. Glenn Dayoan
Assistant Examiner—Scott Carpenter
(74) Attorney, Agent, or Firm—Riches, McKenzie & Herbert LLP; Jeffrey Pervanas

(57) ABSTRACT

A frame for a trailer having a trough is disclosed. The frame has a trough for carrying loads having a curved configuration, such as coils, and a subrail extending longitudinally along the trough. At least one axle can be connected to the frame underneath the trough by connecting it to the subrail. Outside beams extend longitudinally along the frame and are connected to the trough. Slots are provided periodically on either side of the trough which are engageable with safety bars to maintain the longitudinal position of the load in the trough. The frame can be used for a lead trailer or a pup trailer, or both, in a B-train configuration.

19 Claims, 5 Drawing Sheets

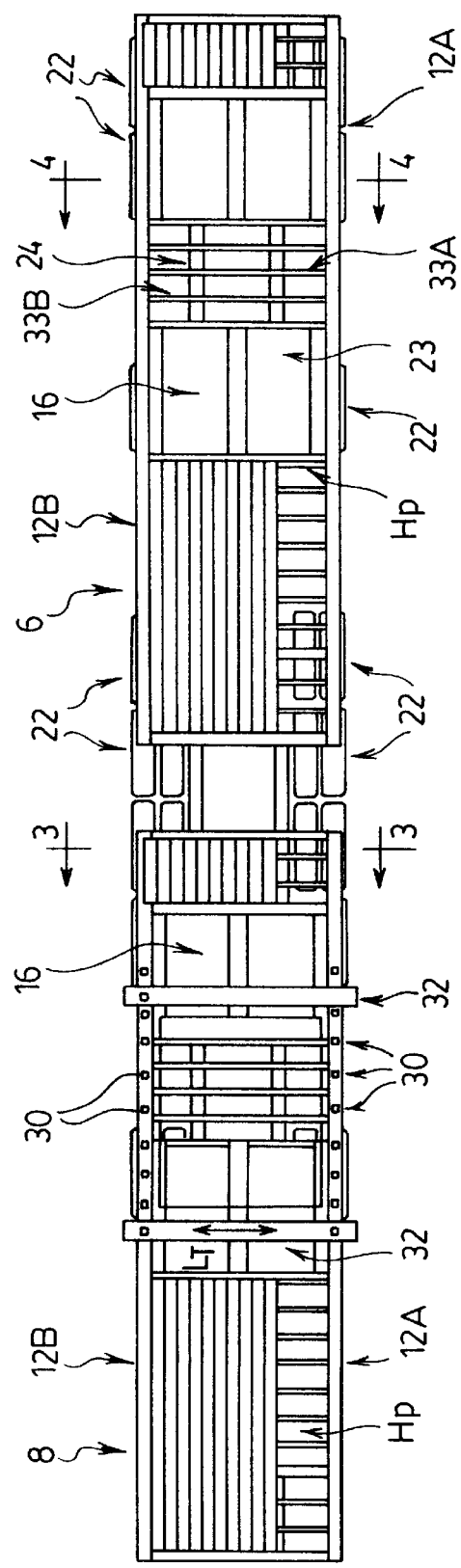
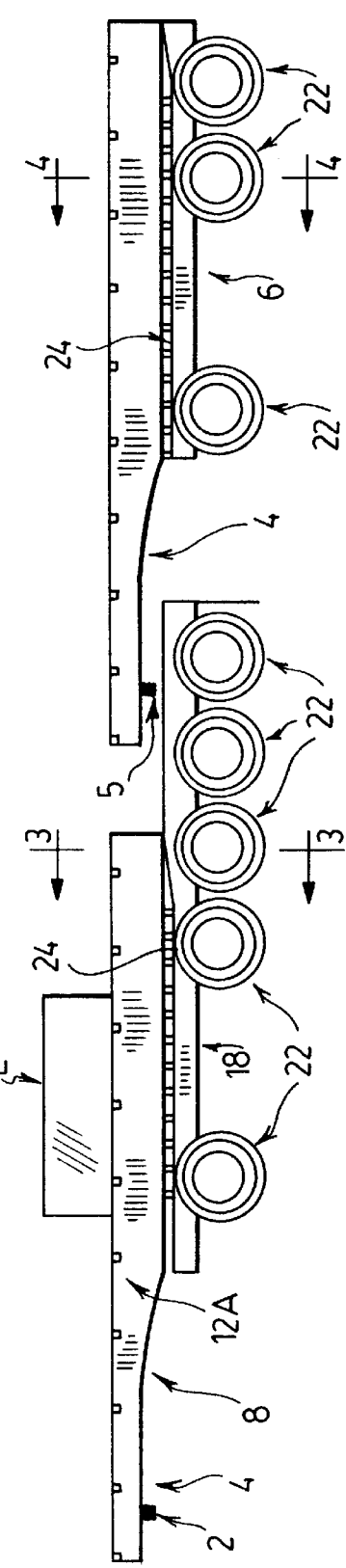
FIG. 2A.
FIG. 2B.

TRAILER FOR CARRYING LOADS HAVING A CURVED CONFIGURATION

FIELD OF THE INVENTION

The present invention relates to trailers. More particularly, the present invention relates to frames for trailers that have a trough.

BACKGROUND OF THE INVENTION

In the past, it has been known to use a truck to haul different types of trailers having loads on the trailers. In this way, trucks can be engaged and disengaged to different types of trailers, thereby increasing the versatility of the trucks and permitting them to haul different types and combinations of trailers.

However, several types of loads cannot be easily maintained on trailers having a flat surface. For example, loads having a curved configuration, such as coils of metal, tanks or pipes, cannot be easily transported on a trailer having a flat surface.

In addition, government highway regulations require trailers to have a certain number of axles for types or weights of loads. For example, it is common that the total weight is a function of the number of axles, the inter-axle distances and whether or not the axles are in clusters or separated. Also, highway regulations generally require the axles to be at specific longitudinal positions along the longitudinal axis of the trailer frame depending on the type of train and the load to be carried. For example, in a B-train, which is a train having a first or lead trailer connected to a second or pup trailer by a king pin and gooseneck connection, both the lead and pup trailers must have axles at specific longitudinal positions, both with respect to the king pin connection to the tractor, and, inter-axially with respect to the axles.

While having axles in specific longitudinal positions can be relatively easily accomplished when the trailer is a flat surface, this becomes more difficult for trailers which do not have flat surfaces. Accordingly, prior art trailers did not provide for easy transportation of non-flat loads on non-flat trailers and with axles located at the specific longitudinal positions required by government regulations.

Therefore, there has been a need in the art to provide non-flat trailers that can efficiently and easily accommodate loads having different configurations, and in particular loads which have curved configurations. In addition, there has been a need in the art to provide a frame for a trailer that can carry loads having curved configurations, but still provide the required number of axles at specific longitudinal positions, to comply with government regulations.

SUMMARY OF THE INVENTION

Accordingly, it is an object of this invention to at least partially overcome the disadvantages of the prior art. Also, it is an object of this invention to provide a trailer frame which can accommodate loads having curved configurations, including circular loads such as coils and pipes. Furthermore, it is an object of the present invention to provide a trailer that can accommodate loads having a curved configuration and still have any number of axles at any longitudinal position along the frame to comply with government regulations.

Accordingly, in one of its aspects, the present invention provides a frame for a trailer comprising: at least two outside beams extending in a longitudinal direction and defining a horizontal plane of the frame; a trough extending substantially into the horizontal plane; subrails extending in the longitudinal direction and supporting the trough; axles for supporting the frame and connectable to wheels; and wherein at least one axle is connected to the subrails and is longitudinally coincident with the trough.

In a further aspect, the present invention relates to transverse support member for use in a frame for a trailer, said transverse support member comprising: a first end for connection to a first outside beam extending in a longitudinal direction; a second end for connection to a second outside beam extending in a longitudinal direction; an indentation in said transverse support member between said first end and said second end, said indentation having a surface for connection to at least one subrail; wherein a plurality of substantially identical transverse support members can be connected to the first and second outside beams and at least one subrail to define a trough in the frame of the trailer; and wherein at least one axle can be connected to the at least one subrail at a longitudinal position coincident with the trough.

Accordingly, one advantage of the present invention is that, by providing a trough, curved loads, including circular loads, can be easily accommodated and transported. Accordingly, the present invention provides a trailer frame which can be used to easily transport loads having non-flat configurations, such as curved loads, circular loads and other non-flat loads, in a secure and stable manner.

In addition, by providing a trough with a fairly large depth, such as three feet, cylindrical loads, such as sheets of coiled metal, which generally come in 60" diameters, can fit into the trough such that more than 50% of the coil is located within the trough. This lowers the centre of mass of the load and trailer combination which increases the stability of the load within the trailer to ensure that the load does not inadvertently fall off of the trailer, or, that the trailer and load tip over.

A further advantage of the present invention is that by securing the load within a trough, safety bars can be connected transversely across the trough to maintain the longitudinal position of the load.

Moreover, a further advantage of the present invention is that, because the axles can be placed in any number and in any longitudinal position in the longitudinal direction and along the longitudinal axis of the trailer, the trailer can be manufactured to meet government regulations for any number of jurisdictions.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention:

FIG. 2A is a top view of a trailer according to one embodiment of the present invention;

FIG. 2B is a side view of the trailer shown in FIG. 2A;

DETAILED DESCRIPTION OF THE PREFERRED EMBODIMENTS

Figure 1:
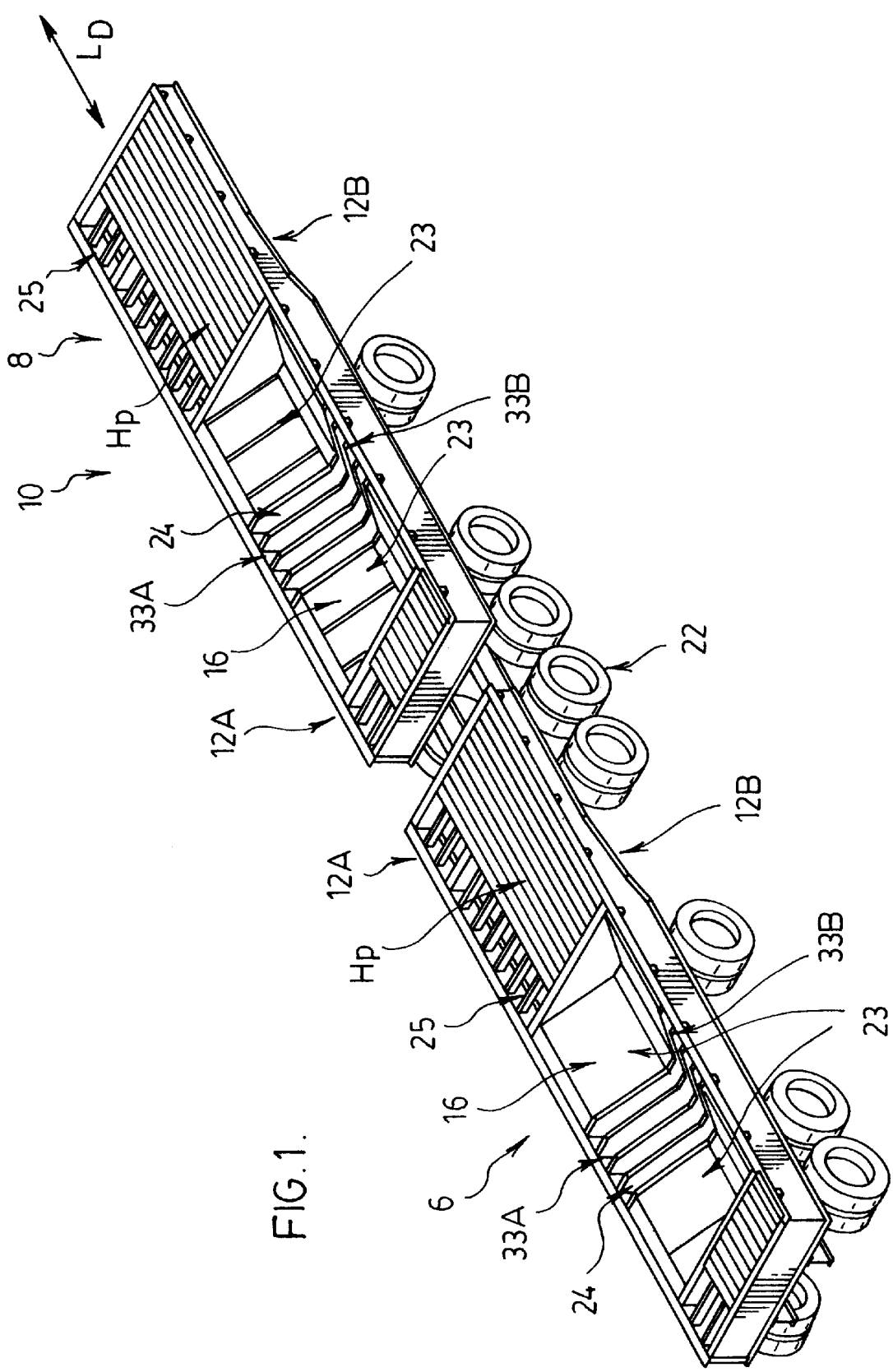
FIG. 1 is a prospective drawing of a trailer according to one embodiment of the present invention.

As shown in FIG. 1, one embodiment of the present invention relates to frames, shown generally by reference numeral 10, for use in trailers. FIG. 1 shows two trailers, namely the lead trailer 8 and the pup trailer 6, connected in a B-train format. The frame 10 of the present invention is used in both the lead trailer 8 and pup trailer 6.

Figure 3:
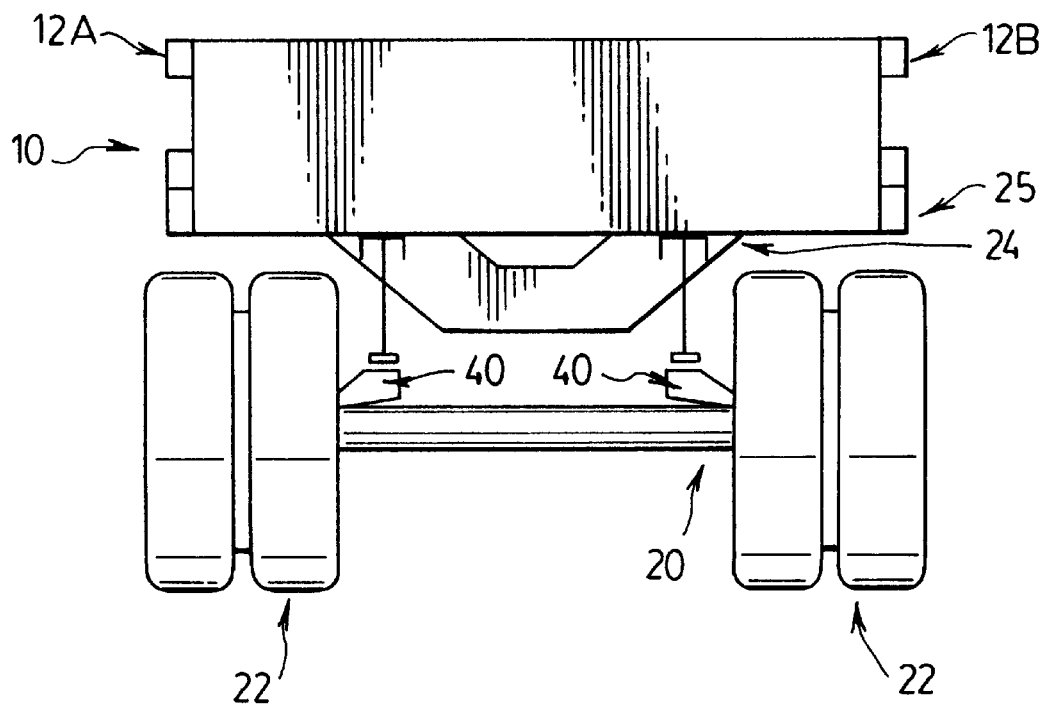
FIG. 3 is a sectional view of the trailer shown in FIGS. 2A and 2B along line 3—3.
Figure 4:
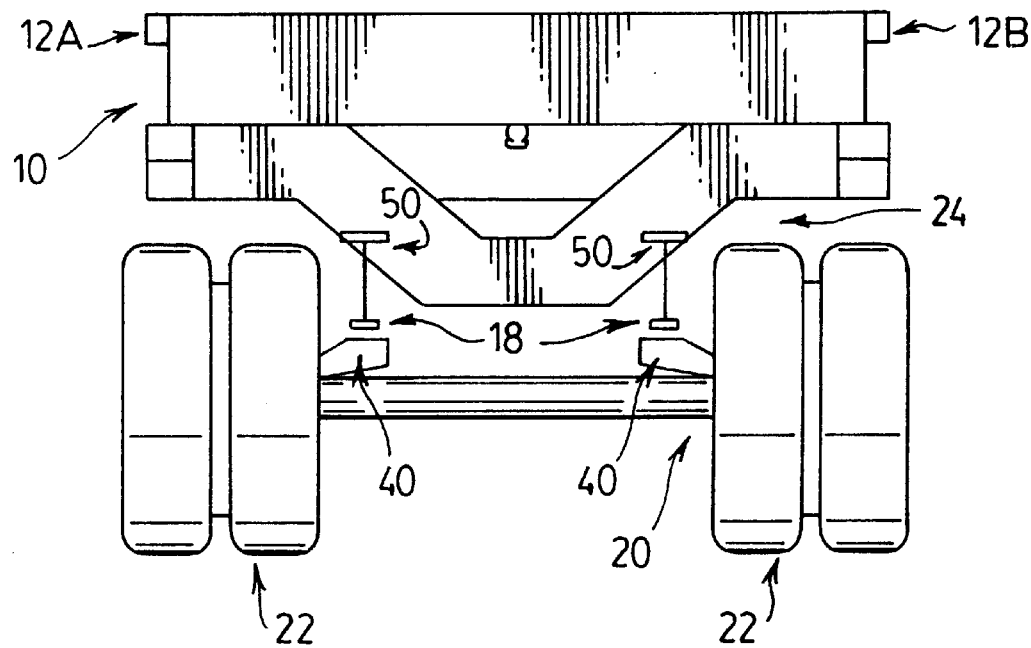
FIG. 4 is a sectional view of the trailer shown in FIGS. 2A and 2B along line 4—4.

As shown in FIG. 2B, the lead trailer 8 and the pup trailer 6 each have a king pin 2 and gooseneck connection 4. This permits both the lead trailer 8 to be connected to a truck (not shown) and permits the pup trailer 6 to be connected to the lead trailer 8 by a king pin connection, as is known in the art. One advantage of the B-train format is that either the lead trailer 8 or the pup trailer 6 can be connected directly to the truck (not shown) by means of the gooseneck connection 4, which makes the B-train format very versatile. One disadvantage of the B-train format is that the lead trailer 8 and pup trailer 6 must have a specific number of axles 20, and also, the axles 20 must be located at specific longitudinal positions in the longitudinal direction $L_D$. The axles 20, shown best in FIGS. 3 and 4, are connectable to the wheels 22 so that the frame 10 can be used to haul a payload L.

In general, the axles 20 must be located at a specific longitudinal position with respect to the king pin 2 for connection to the tractor (not shown). Furthermore, in a B-train format, as shown in FIGS. 1, 2A and 2B, the lead trailer 8 will have at least five axles and a rear stinger 5 for connection to the gooseneck 4 of the pup trailer 6. However, as best illustrated at least in FIG. 2B, it is not possible to have a lead trailer 8 with five axles 20, unless the five axles 20 are spaced along the longitudinal direction $L_D$ of most of the lead trailer 8.

As also shown in FIGS. 1, 2A and 2B, both of the trailers 8 and 6 comprise a trough 16. The trough 16 extends substantially into a horizontal plane $H_p$ formed by the two outer rails 12A, 12B. As shown in FIGS. 2A and 2B, a payload, shown generally by the reference letter L, can be transported within one, or both, of the troughs 16. The payload L can be a non-flat load, such as a circular coil as shown in FIGS. 2A and 2B. As also shown in FIGS. 2A and 2B, at least one axle 20 is longitudinally coincident with one of the troughs 16.

Preferably, the load L will sit substantially in the trough 16. In this way, the centre of mass of the load L and trailer 8 will be lower and closer to the ground because the load L, which is a substantial part of the weight, will be within the trough 16, and therefore closer to the ground. By having the centre of the mass of the load L and trailer 8 combination lower to the ground, the overall stability of the trailer 8 increases, thereby making the trailer 8 safer.

As also shown in FIGS. 2A and 2B, the frame 10 of trailers 8 and 6 comprise a plurality of transverse support members 24 which extend below the horizontal plane $H_p$. The transverse support members 24 have first and second ends 33A, 33B which are connected to the outside beams 12A, 12B. The transverse support members 24 define the trough 16 and support a cladding, such as metal sheeting 23, upon which the load L is placed. The metal sheeting 23 is partially removed in FIG. 2A to assist in illustrating the transverse support members 24.

The transverse support members 24 are in turn connected to subrails 18. The subrails 18 extend in a longitudinal direction $L_D$ and support the payload L in the trough 16 by supporting the transverse support members 24.

The subrails 18 are in turn supported by the axles 20 which are connectable to wheels 22. This is perhaps best illustrated in FIGS. 3 and 4 which are a cross-section of the trailer frame 10 shown in FIGS. 2A and 2B along lines 3—3 and 4—4, respectively.

The subrails 18 are supported on the axles 20 through a suspension, shown generally by reference numeral 40 in FIGS. 3 and 4. It is understood that the suspension 40 can comprise any known type of suspension device and connection device to connect the axles 20 to subrails 18, including springs and shock absorbers.

The cross-section shown in FIG. 4 illustrates at least one axle 20 connected to the subrails 18 at a longitudinal position coincident with the trough 16. Accordingly, as illustrated in FIG. 4, the frame 10, according to the present invention, permits the axle 20 to be connected to the frame 10 at any longitudinal position, including a longitudinal position which is longitudinally coincident with the trough 16. This permits any number of axles 20 to be positioned at any longitudinal position along the trailers 6, 8, improving the stability of trailers 6, 8. This also permits axles 20 to be at any longitudinal position in the longitudinal direction $L_D$ so that the trailer 6, 8 will comply with government regulations.

FIG. 3 shows the connection of the axle 20 to the frame 10 at locations which do not coincide with the longitudinal position of the trough 16 into the longitudinal direction $L_D$. As shown in FIG. 3, the subrails 18 are connected to horizontal support members 25 which extend horizontally across the horizontal plane $H_p$ and do not extend into the horizontal plane $H_p$. In this way, a unitary subrail 18 could be used for connection to all of the axles 20, whether or not the axles 20 are longitudinally coincident with the trough 16.

To assist in connecting the subrails 18 to the transverse members 24, a notch 50 is preferably removed from a surface 36 of the transverse support members 24. The subrails 18 are then inserted into the notches 50 and welded together. By use of the notches 50, the total contact surface area of the subrails 18 with the transverse support member 24 increases, thereby improving the strength of the frame 10. Also, by increasing the contact surface area, the surface area which can be welded to connect the transverse support members 24 to the subrails 18 also increases.

Figure 5A:
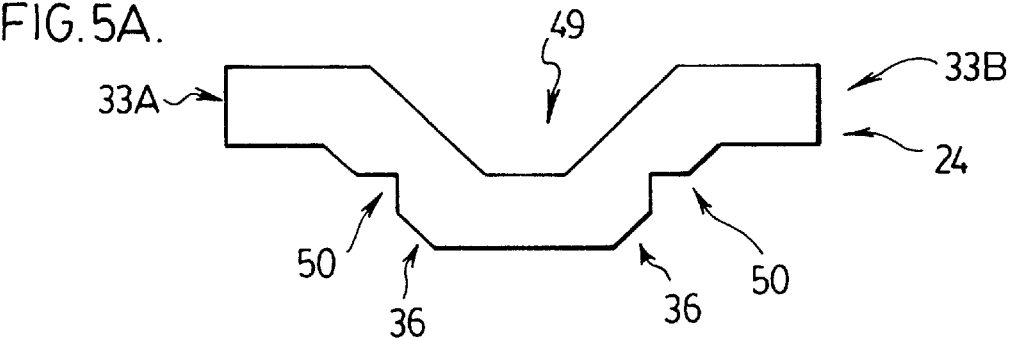
FIG. 5A is a side view of a transverse support member for an embodiment of the invention where the trough is substantially trapezoidal-shaped.
Figure 5B:
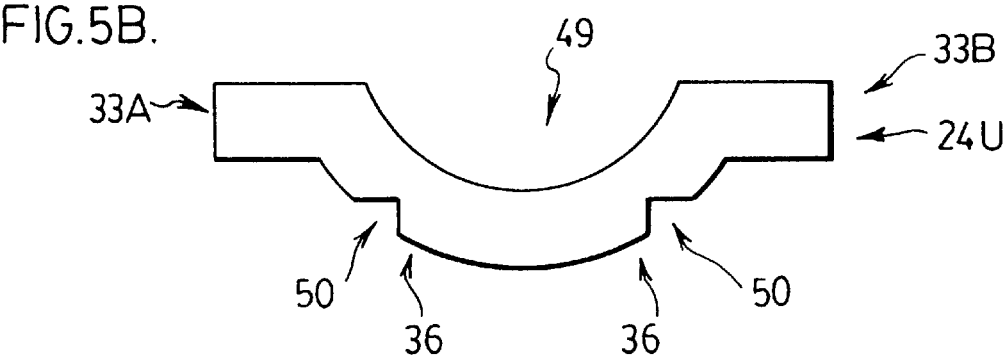
FIG. 5B is a side view of a transverse support member for an embodiment of the invention where the trough is substantially U-shaped.
Figure 5C:
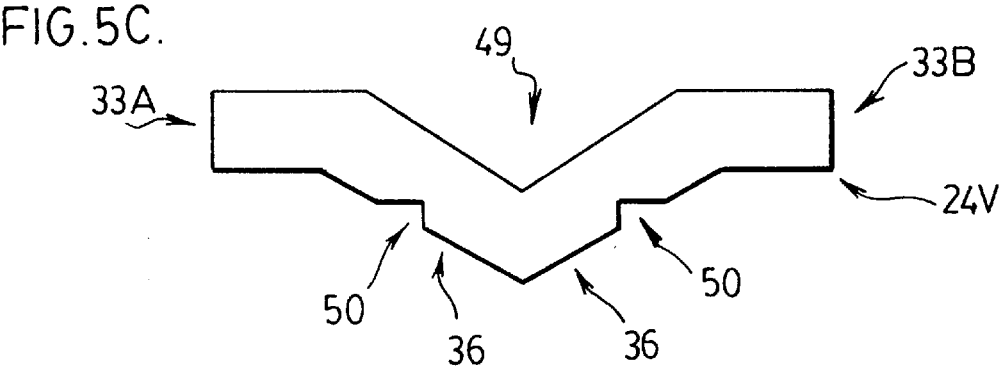
FIG. 5C is a side view of a transverse support member for an embodiment of the invention where the trough is substantially V-shaped.
Figure 5D:
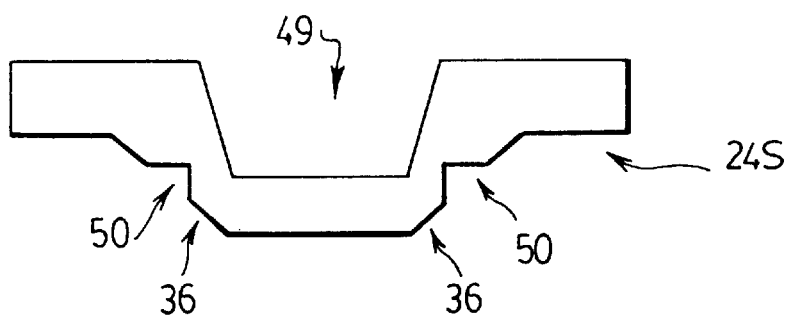
FIG. 5D is a side view of a transverse support member for an embodiment of the invention where the trough is substantially square-shaped.

In a preferred embodiment, as shown in FIGS. 1, 2A, 2B, 3 and 4, the trough 16 has a substantially trapezoidal cross-section. To accomplish this, the transverse support members 24 have an indentation 49 with a substantially trapezoidal cross-section, as shown in FIG. 5A. However, in addition to a trapezoidal cross-section, troughs 16 having other cross-sections can also be used, and may be preferred in certain situations. For example, FIG. 5B shows a trapezoidal support member 24U having an indentation 49 with substantially U-shaped cross-section which would be used to manufacture a trough 16 having a substantially U-shaped cross-section. Similarly, FIG. 5C shows a transverse support member 24V having an indentation 49 with substantially V-shaped cross-section for use in embodiments where a V-shaped trough 16 is preferred. In addition, FIG. 5D shows a transverse support member 24S having an indentation 49 with substantially square cross-section for use in embodiments where a substantially square-shaped trough 16 is preferred.

In order to attach the load L to the trailers 8 and 6, any known means of securing the load L to the trailers 8 and 6 could be used. For example, the load L could be secured by chains and/or ropes to the trailers 8 and 6. In a preferred embodiment, to further assist in preventing movement of the load L, a plurality of slots 30 are provided extending longitudinally along both longitudinal sides of the trough 16. The slots 30, shown at least in FIG. 2A, cooperate with a transverse safety bar 32 such that the ends of the transverse safety bar 32 are connectable to the slots 30. In this way, a safety bar 32 can be connected to a pair of slots 30 on opposite sides of the trough 16 so that the transverse safety bar 32 extends transversely across the trough 16 in a transverse direction $L_T$ which is substantially perpendicular to the longitudinal direction $L_D$. Use of two transverse safety bars 32 secured to the slots 30 transversely across the trough 16 prevent the load L from shifting in the longitudinal direction $L_D$. Such shifting of the load L could be caused, for example, by sudden acceleration or decerelation of the trailers 6, 8. If the trough 16 has structurally strong ends, only one transverse safety bar 32 could be used with the end of the trough 16 performing the function of the second transverse safety bar 32.

Figure 6A:
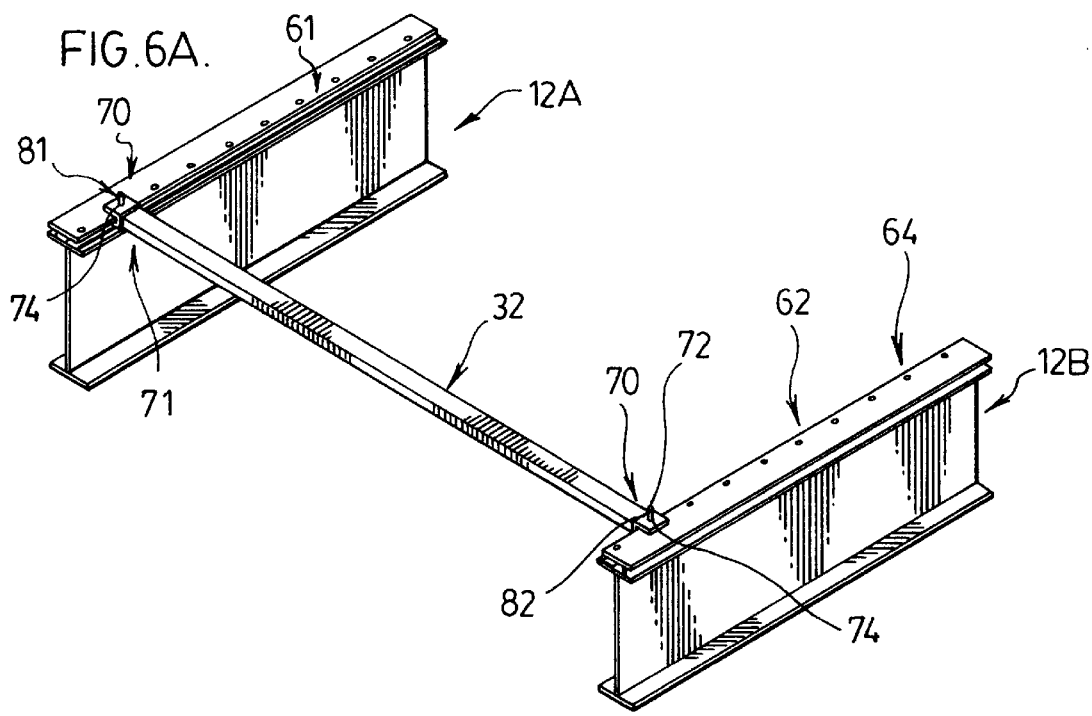
FIG. 6A illustrates a connecting device for a transverse safety bar according to one embodiment of the present invention.
Figure 6B:
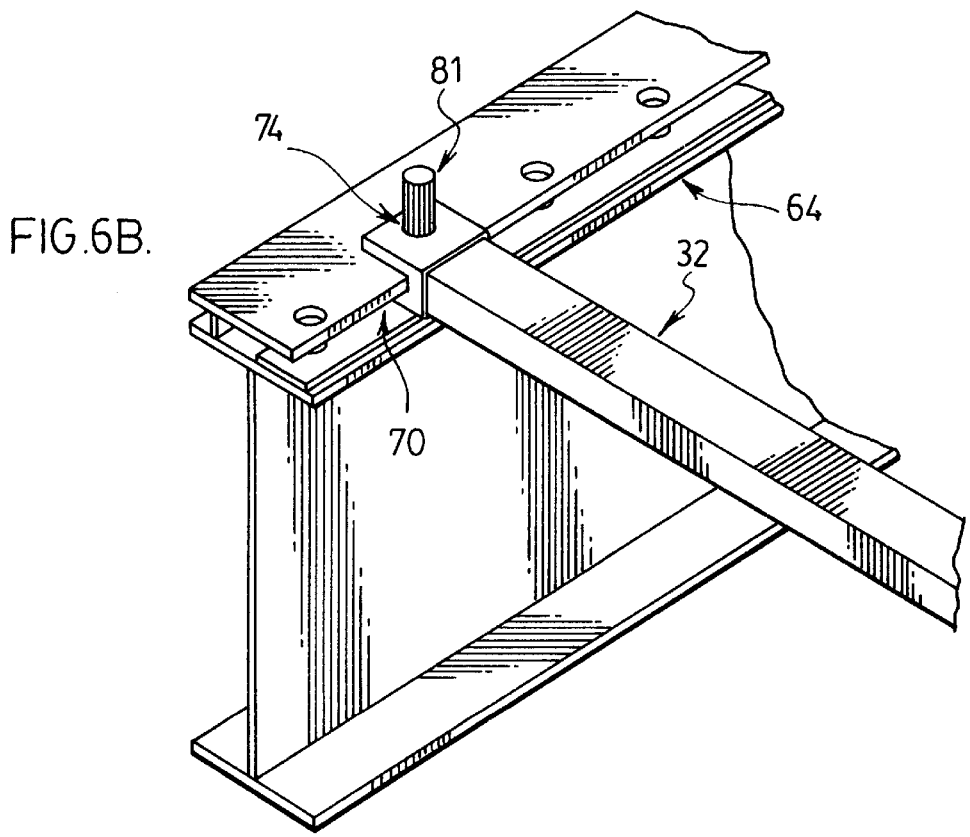
FIG. 6B is a detailed drawing of the connecting device shown in FIG. 6A.

In an alternate embodiment, rather than using the slots 30 as a connecting device to connect the transverse safety bar 32 across the trough 16, FIG. 6A shows an alternative embodiment utilizing a first plurality of holes 61 along a first longitudinal side of the trough 16 and a second plurality of holes 62 along a second longitudinal side of the trough 16. As shown in detailed drawing FIG. 6B, the transverse safety bar 32 in this embodiment comprises a U-shaped member 70 at both the first end 71 and second end 72 of the transverse safety bar 32. The U-shaped members 70 at both ends 71, 72 of the transverse safety bar 32 comprise holes 74.

In operation, the transverse safety bar 32 is placed transversely across the trough 16 at the desired longitudinal position and such that the holes 74 in the U-shaped members 70 of each end 71, 72 coincide with one hole of the first plurality of holes 61 and another hole of the second plurality of holes 62, respectively, along the longitudinal sides of the trough 16. A first pin 81 can then be received in the hole 74 of the first end 71 of the transverse safety bar 32 and a corresponding one of the first plurality of holes 61 along the longitudinal side of the trough 16. As shown best in FIG. 6B, a lower stop plate 64 is provided to prevent the pin 81 from passing through the holes, rather than remaining within the holes 74 and the corresponding one of the first plurality of holes 61. In a similar manner, the second pin 82 is placed through the hole 74 at second end 72 of the transverse safety bar 32 and the corresponding one of the second plurality of holes 62 along the other longitudinal side of the trough 16. The pin 82 is held in place by a stop plate 64 also. In this way, the safety bar 32 can be easily connected transversely across the trough 16 at the desired longitudinal position and prevent longitudinal movement of the payload L in the trough 16.

A second safety bar 32 can likewise be connected to further prevent transverse movement of the payload L. It is understood that other connecting devices, in addition to the slots 30 or the holes 61, 62, 74 and pins 81, 82 could also be used to maintain the transverse safety bar 32 in the desired longitudinal position.

The present invention has been described in terms of a B-train having a lead trailer 8 and a pup trailer 6 where both the lead trailer 8 and the pup trailer 6 have a frame 10 and trough 16 according to the present invention. However, it is understood that the frame 10 of the present invention could be used on only one of the lead trailer 8 or the pup trailer 6 with the other trailer, either the lead trailer 8 or the pup trailer 6, having a conventional frame (not shown).

It is understood that while the present invention is shown with respect to a preferred embodiment, namely a trailer having a B-train format, the invention is not limited to this type of format. Rather, the present invention can be used with any type of trailer format, including a single trailer, an A-train or a C-train, to permit the axles to be located at any longitudinal position, even underneath a trough.

It is also understood that each of the elements described above with respect to the frame 10 of the trailers 8 and 6 will be connected together to form a sturdy, preferably unitary, structure for transporting a load L. Preferably, the connection between the parts can be made through welding, however, any other known means for connecting the various elements together could also be used, including adhesives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A frame for a trailer comprising:
   at least two outside beams extending in a longitudinal direction and defining a horizontal plane of the frame;
   a trough extending substantially into the horizontal plane and comprising transverse support members extending into the horizontal plane in a substantially transverse direction, said transverse support members being connected to said at least two outside beams;
   subrails extending in the longitudinal direction and supporting the trough;
   notches in the transverse support members for receiving and connecting the subrails;
   axles for supporting the frame and connectable to wheels; and
   wherein at least one axle is connected to the subrails and is longitudinally coincident with the trough.

2. The frame as defined in claim 1 wherein the transverse support members have cladding attached thereto upon which a payload can be placed.

3. The frame as defined in claim 2 further comprising suspension means connecting the axles to the subrails.

4. The frame as defined in claim 1 further comprising:
   slots extending in the longitudinal direction along both longitudinal sides of the trough;

a first transverse safety bar connectable to the slots; and wherein the first transverse safety bar can be connected to the slots such that the first transverse safety bar extends across the trough in a substantially transverse direction to prevent movement of a load in the longitudinal direction.

5. The frame as defined in claim 1 further comprising wheels connected to the axles.

6. The frame as defined in claim 1 wherein the frame is for a trailer to be used with another trailer in a B-train format.

7. The frame as defined in claim 6 wherein the frame is for a lead trailer and further comprises a gooseneck and at least five axles.

8. The frame as defined in claim 6 wherein the frame is for a pup and the trailer further comprises a gooseneck for connection to a lead trailer.

9. The frame as defined in claim 1 wherein the trough has a substantially trapezoidal cross-section.

10. The frame as defined in claim 1 wherein the trough has a substantially U-shaped cross-section.

11. The frame as defined in claim 1 wherein the trough has a substantially V-shaped cross-section.

12. The frame as defined in claim 1 wherein the trough has a substantially square-shaped cross-section.

13. The frame as defined in claim 4 further comprising a second transverse safety bar connectable to the slots;

wherein the second transverse safety bar can be connected to the slots such that the second transverse safety bar extends across the trough in the substantially transverse direction; and wherein the first transverse safety bar and second transverse safety bar are placed at longitudinal positions corresponding to longitudinal ends of a load in the trough such that first and second transverse members prevent movement of the load in the longitudinal direction.

14. The frame as defined in claim 1 further comprising:

connecting devices extending in a longitudinal direction along a first longitudinal side and a second longitudinal side of the trough, said connecting devices cooperating with a first end and a second end of a transverse safety bar to connect the ends of the transverse safety bar at a plurality of longitudinal positions along the trough; and wherein one connecting device on the first longitudinal side of the trough can be connected to the first end of the transverse safety bar, and, another connecting device on the second longitudinal side of the trough can be connected to the second end of the transverse safety bar, such that the transverse safety bar extends across the trough in a substantially transverse direction to prevent longitudinal movement of a load in the trough.

15. The frame as defined in claim 14 wherein the connecting devices comprise a first plurality of holes extending along a first longitudinal side of the trough, a second plurality of holes extending along a second longitudinal side of the trough, and at least one hole in each of the first end and second end of the transverse safety bar; and wherein a first pin can be received in the hole of the first end of the transverse safety bar and one of the first plurality of holes extending along the first longitudinal side, and, a second pin can be received in the hole of the second end of the transverse safety bar and one of the second plurality of holes extending along the second longitudinal side to connect the first and second ends of the transverse safety bar to the first and second longitudinal sides, respectively, of the trough.

16. The frame as defined in claim 14 wherein the connecting devices comprise slots which cooperate with the first end and the second end of the transverse safety bar to connect the first end and the second end of the transverse safety bar to the first and second longitudinal sides, respectively, of the trough.

17. The frame as defined in claim 5 wherein all of the axles are connected to the subrails.

18. A transverse support member for use in a frame for a trailer, said transverse support member comprising:

a first end for connection to a first outside beam extending in a longitudinal direction;

a second end for connection to a second outside beam extending in a longitudinal direction;

an indentation in said transverse support member between said first end and said second end, said indentation having a surface for connection to at least one subrail;

wherein a plurality of substantially identical transverse support members can be connected to the first and second outside beams and at least one subrail to define a trough in the frame of the trailer; and wherein at least one axle can be connected to the at least one subrail at a longitudinal position coincident with the trough.

19. The transverse support member as defined in claim 18 further comprising at least one notch at the surface for receiving and connecting the surface to the at least one subrail.

* * * * *